March 21, 1950     K. R. HAMMERSTROM     2,501,049
RAILWAY BOLSTER CENTER BEARINGS
Filed Dec. 28, 1945     2 Sheets—Sheet 1
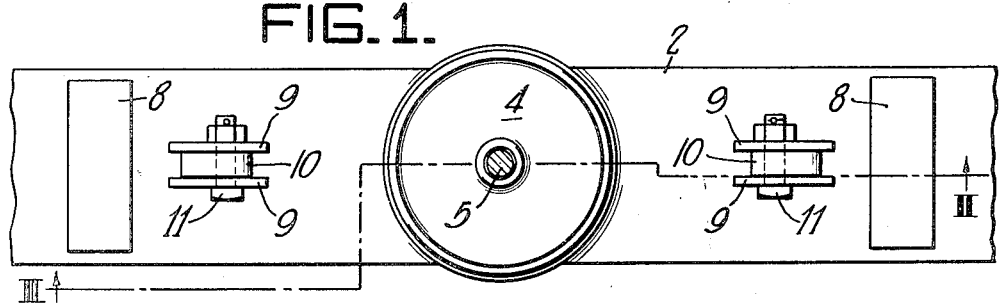
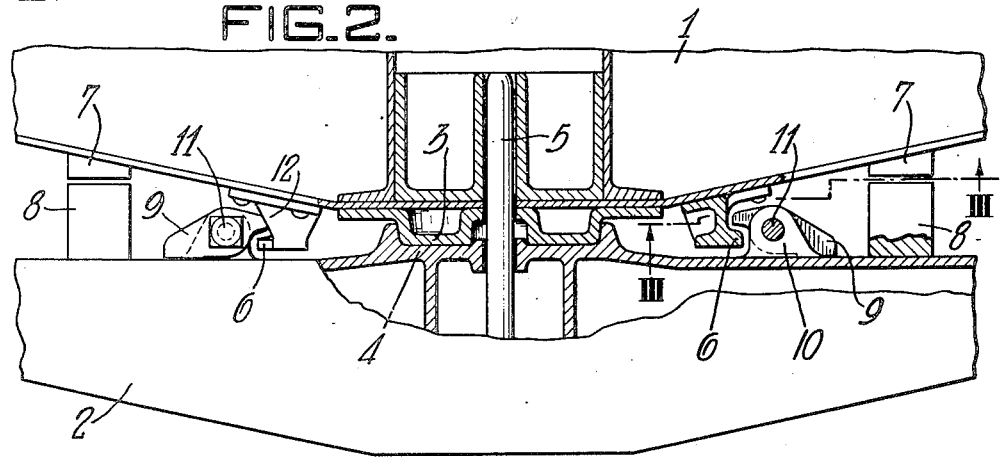
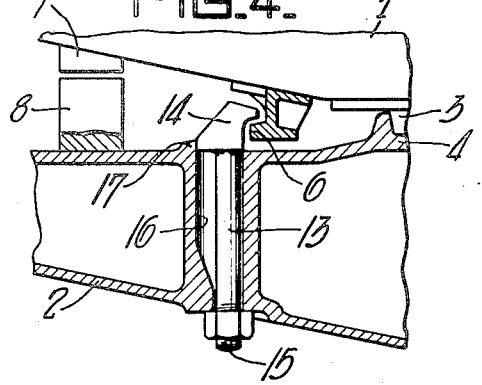
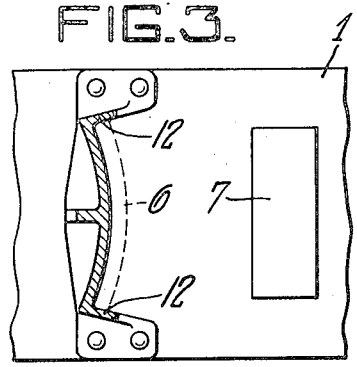
INVENTOR:
KARL R. HAMMERSTROM.
BY: Donald G. Dalton
HIS ATTORNEY.

March 21, 1950 K. R. HAMMERSTROM 2,501,049
RAILWAY BOLSTER CENTER BEARINGS
Filed Dec. 28, 1945 2 Sheets-Sheet 2
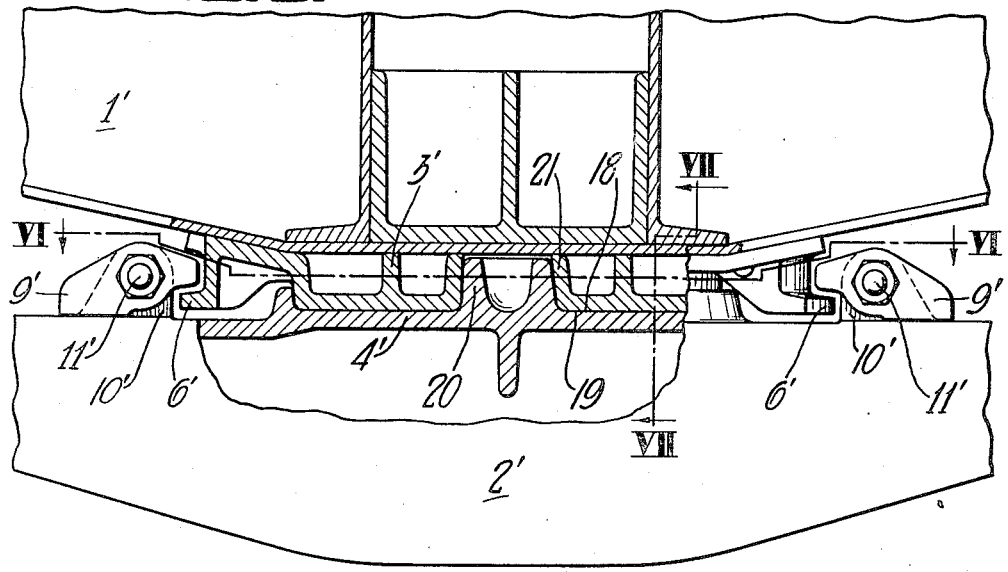
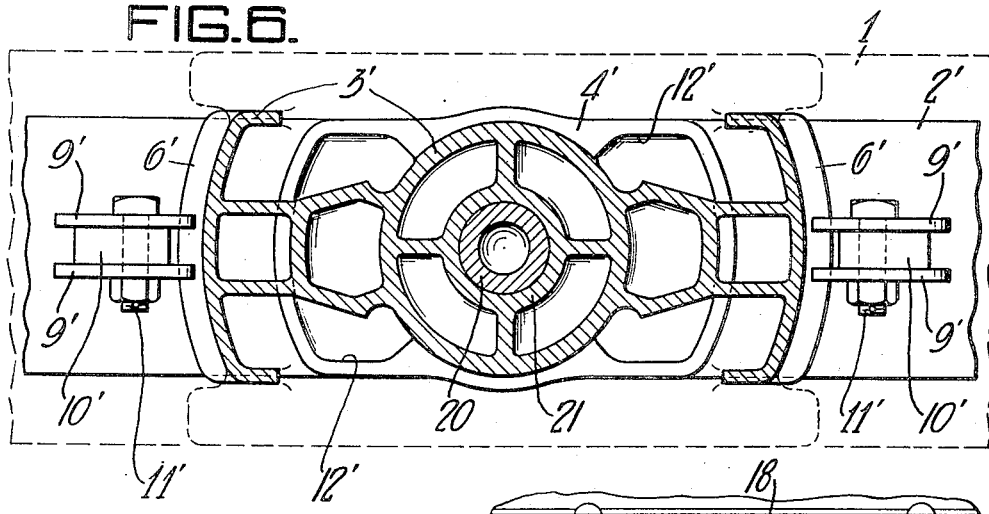
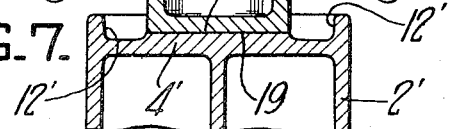
INVENTOR:
KARL R. HAMMERSTROM,
BY: Donald G. Dalton
HIS ATTORNEY.

Patented Mar. 21, 1950

2,501,049

UNITED STATES PATENT OFFICE 2,501,049

RAILWAY BOLSTER CENTER BEARINGS

Karl R. Hammerstrom, Dormont, Pa., assignor to United States Steel Corporation of Delaware, a corporation of Delaware Application December 28, 1945, Serial No. 637,625

1 Claim. (Cl. 105—199)

This invention is a railway car assembly comprising body and truck bolsters pivotally interconnected by body and truck center plates that are vertically separable and with the assembly characterized by means for restraining vertical separation of these center plates and for maintaining pivoting of the truck bolster within fixed limits. When applied to a freight car this assembly has the advantage of permitting the car to operate at higher speeds than are safe otherwise.

The invention is illustrated by the accompanying drawings, in which:

Figure 1 is a top view of a truck bolster and its truck center plate;

Figure 2 is a partly sectioned side view of the above in assembly with a longitudinally sectioned body bolster and its body center plate, the sectioned portion of the truck bolster and truck center plate being taken from the line II—II in Figure 1, this assembly embodying an example of the invention;

Figure 3 is a partly horizontally sectioned segment of the bottom of the body bolster and is taken from the line III—III in Figure 2;

Figure 4 is a segment, in longitudinal section, of Figure 2, showing a modification of this example of the invention;

Figure 5 is similar to Figure 2 but shows a second example of the invention;

Figure 6 is a horizontal section of Figure 5 taken from the line VI—VI in Figure 5; and Figure 7 is a cross section taken from the line VII—VII in Figure 5.

More specifically, referring to the first example, these drawings illustrate the body bolster 1 and the truck bolster 2 pivotally interconnected by the body center plate 3 and the truck center plate 4 working about a king pin 5. This much follows conventional practice wherein the center plates are held together solely by the weight of the car body, there being nothing to prevent vertical separation of the center plates or to prevent excessive pivoting of the truck bolster in case of a derailment. These are some of the objectionable features that have limited the speed of freight cars in the past.

However, in the case of the present invention, one of the center plates connects with flanges 6 arranged transversely between the bolsters 1 and 2 and intermediate the center plates 3 and 4 and the bolster side bearing portions, which are the portions in line with the body bolster side bearing 7 and the truck bolster side bearing 8, these flanges being curved concentrically about the axis of the center plates 3 and 4 located by the king pin 5. The other of the center plates connects with retainers engaging the flanges 6 upon separating movement of the center plates, these retainers being in the form of dogs 9 releasably attached to lugs 10 by bolt and nut fastenings 11. Preferably, the flanges 6 connect with the body center plate 3 by being fastened to the body bolster 1, while the retainers connect with the truck center plate 4 by way of the lugs 10 being parts of the truck bolster 2. These flanges 6 have, at both ends, abutments 12 engaged by the dogs 9, which are the mentioned retainers, upon pivoting of the truck bolster 2 beyond limits fixed by the flange lengths, it being understood that the flanges extend equal distances transversely of the center line of the truck bolster 2. The dogs 9 obviously are removable to permit assembly and disassembly of the various parts.

In the modification of this first example, the dogs 9, lugs 10 and fastenings 11 are replaced by vertical bolts 13 having dogs 14 on their upper ends, for engaging the flanges 6, and nuts 15 on their bottom ends, these bolts being vertically positioned in vertical holes 16 formed in the truck bolster 2 and which are elongated longitudinally of the truck bolster throughout all but their lowermost portions. With this arrangement, loosening of the nuts 15 permits the bolts 13 to swing away from the flanges 6 for assembly and disassembly, and to be swung with their dogs over the flanges 6 and fixed in these positions by tightening of the nuts 15, the bolster having abutments 17 arranged so that the dog heads of the bolts 13 may drop below these abutments 17 and positively prevent outward swinging of the bolts 13 when the nuts 15 are tightened.

The second example is sufficiently similar to the first to make it appropriate to apply the same numerals to the same parts, distinction being effected by priming the various numerals, but there is one big distinction in that the body and truck center plates 3' and 4' have cooperating horizontal bearing surfaces 18 and 19, respectively, that are approximately as long transversely of the truck bolster 2' as the latter is wide and which are materially wider lengthwise of the truck bolster than their lengths transversely of the latter. In other words, the two center plates provide annular cooperating bearing surfaces which are made as big as is practical considering the bolster width, and these cooperating bearing surfaces then extend longitudinally of the truck bolster to considerably greater extents. This has the advantage of greatly enhancing the lateral stability of the car body.

The second example involves another difference over the first example in that the king pin 5 of the latter is eliminated by providing the truck center plate with an upstanding annulus 20 and the body center plate with a recess 21 receiving this annulus 20, the annulus and recess providing vertical and cylindrical cooperating bearing surfaces of sufficient areas to make the king pin unnecessary.

I claim:

A railway car comprising body and truck bolsters, vertically separable center plates on said bolsters, and pivot means interconnecting said center plates for turning on a vertical axis so that said truck bolster can turn relative to said body bolster, said center plates furnishing bearing surfaces having a circular center region whose dimension longitudinally of the car is substantially equal to the width of the bolsters and regions which extend laterally from said central region and increase the dimension of the bearing surfaces laterally of the car to appreciably greater than their dimension longitudinally of the car.

KARL R. HAMMERSTROM.

REFERENCES CITED

The following references are of record in the file of this patent:

UNITED STATES PATENTS

| Number | Name | Date |
|---|---|---|
| 311,553 | Wilson | Feb. 3, 1885 |
| 1,868,530 | Harley et al. | July 26, 1932 |
| 2,128,281 | Blomberg | Aug. 30, 1938 |
| 2,249,467 | Finch | July 15, 1941 |